United States Patent
Du et al.

(10) Patent No.: US 8,896,743 B2
(45) Date of Patent: Nov. 25, 2014

(54) ENCLOSURE FOR IMAGE CAPTURE SYSTEMS WITH FOCUSING CAPABILITIES

(75) Inventors: Zheng Du, San Jose, CA (US); Denis Chu, Fremont, CA (US); Yi-Chang Hsieh, Hsinchu (TW); Wei-Feng Lin, Hsinchu (TW); Wen-Jen Ho, Qionglin Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 718 days.

(21) Appl. No.: 13/156,014

(22) Filed: Jun. 8, 2011

(65) Prior Publication Data

US 2012/0315953 A1 Dec. 13, 2012

(51) Int. Cl.
*H04N 5/225* (2006.01)
*H04N 5/232* (2006.01)
*G03B 13/36* (2006.01)

(52) U.S. Cl.
CPC ......... *H04N 5/2257* (2013.01); *H04N 5/23212* (2013.01); *G03B 13/36* (2013.01)
USPC ............ 348/340; 348/335; 348/345; 348/374

(58) Field of Classification Search
CPC .. H04N 5/2252; H04N 5/2253; H04N 5/2254
USPC ............ 348/207.99, 335, 336, 337, 338, 339, 348/340, 342, 343, 344, 345, 357, 360, 361, 348/373, 374, 375
See application file for complete search history.

(56) References Cited

U.S. PATENT DOCUMENTS

| 7,253,963 | B2 | 8/2007 | Lee et al. | |
| 8,115,108 | B2 * | 2/2012 | Sakai | 174/261 |
| 2005/0212947 | A1 * | 9/2005 | Sato et al. | 348/340 |
| 2006/0146414 | A1 | 7/2006 | Cho et al. | |
| 2006/0164540 | A1 | 7/2006 | Kayanuma | |
| 2006/0228103 | A1 | 10/2006 | Go | |
| 2007/0216851 | A1 | 9/2007 | Matsumoto | |
| 2007/0279365 | A1 | 12/2007 | Kageyama | |
| 2009/0268152 | A1 | 10/2009 | Chen | |
| 2010/0039532 | A1 | 2/2010 | Galstian et al. | |

(Continued)

FOREIGN PATENT DOCUMENTS

| CN | 1912672 A | 2/2007 |
| CN | 101796448 A | 8/2010 |
| TW | 200807702 A | 2/2008 |
| WO | WO 2006/054562 A1 | 5/2006 |

OTHER PUBLICATIONS

TW 100144457—Taiwanese Office Action and Search Report with English Translation, issued Oct. 21, 2013 (7 pages).
U.S. Appl. No. 13/155,995—Non-Final Office Action, mailed Mar. 20, 2014, 15 pages.
U.S. Appl. No. 13/155,995—Notice of Allowance, mailed Jun. 20, 2014, 11 pages.

(Continued)

*Primary Examiner* — Twyler Haskins
*Assistant Examiner* — Peter Chon
(74) *Attorney, Agent, or Firm* — Blakely Sokoloff Taylor & Zafman LLP

(57) ABSTRACT

Embodiments of the invention describe an enclosure for an image capture system that includes an image capture unit and a solid state die to provide focusing capabilities for a lens unit of the image capture unit. The enclosure may electrically couple the solid state die to the image capture unit and/or other system circuitry. The enclosure may further serve as EMI shielding for the image capture system.

18 Claims, 9 Drawing Sheets

(56) References Cited

U.S. PATENT DOCUMENTS

2012/0120298 A1    5/2012   Chiu et al.
2012/0140101 A1*   6/2012   Afshari et al. ................ 348/308
2012/0315952 A1   12/2012   Du et al.
2014/0036084 A1*   2/2014   Lu ................................ 348/148

OTHER PUBLICATIONS

CN 201110460499.0—Chinese First Office Action with English Translation and Search report, issued Jun. 27, 2014, 16 pages.
CN 201110461300.6—Chinese First Office Action with English Translation and Search Report, issued Jul. 10, 2014, 21 pages.

* cited by examiner

SOLID STATE DIE

CAMERA MODULE
(IMAGE CAPTURE UNIT)

ENCLOSURE FOR IMAGE CAPTURE SYSTEMS WITH FOCUSING CAPABILITIES

FIELD

Embodiments of the invention generally pertain to image capture systems, and more particularly, but not exclusively, to enhancing or providing focusing capabilities for image capture systems.

BACKGROUND

An image capture unit such as a camera module includes an image sensor and an imaging lens. The imaging lens focuses light onto the image sensor to form an image, and the image sensor converts the light into electric signals. The electric signals are output from the image capture unit to other units in a host electronic system. The electronic system may be a mobile phone, a computer, a digital camera or a medical device.

As use of image capture units in electronic systems increases, so do the demands for image capture features, capabilities and device efficiency. For example, users may expect image capture units to have focusing capabilities (e.g., auto-focus) while having a reduced dimension or footprint and a low cost of manufacture.

An image capture unit typically includes a housing that encloses at least an imaging lens and an image sensor. Currently available image capture units have no auto-focusing capability and no immunity to electro-magnetic interference (EMI). Shielding from EMI is often crucial to prevent misfocusing and other errors caused by EMI.

Thus, there is a need for manufacturing an image capture system having advanced functions such as focusing capabilities and EMI shielding, characterized by high reliability and low cost.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe an enclosure or housing for an image capture system that includes a solid state die to provide focusing capabilities for a lens unit of the image capture system. The enclosure may electrically couple the solid state die to the image capture system and/or other system circuitry. The enclosure may further serve as electromagnetic interference (EMI) shielding for the image capture system.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
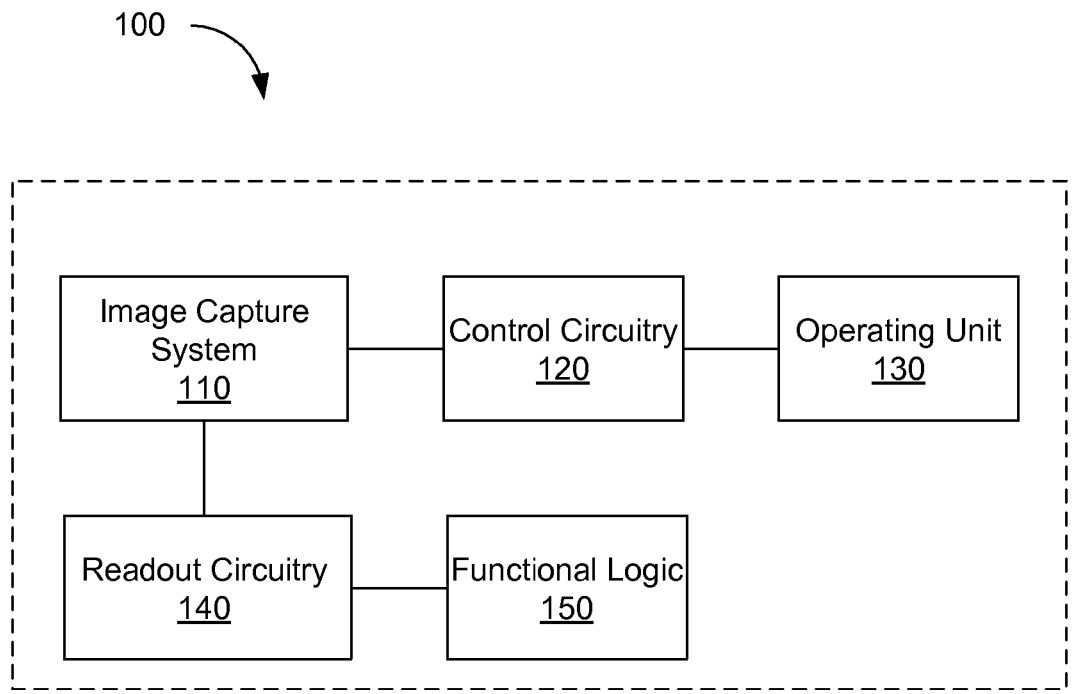
FIG. 1 is a block diagram of an electronic system in accordance with an embodiment of the disclosure.

FIG. 1 is a block diagram of an electronic system in accordance with an embodiment of the disclosure. Electronic system 100 may be, for example, a mobile phone, a computer, a digital camera or a medical device. Electronic system 100 as illustrated includes image capture system 110. Said image capture system may be any system utilizing a solid state die as a focusing mechanism similar to the example embodiments of the invention described below.

Image capture system 110 may include a lens unit and an image sensor unit. Said image sensor system may include, for example, a two-dimensional (2D) array of imaging pixels. Each imaging pixel may be arranged into a row and a column to acquire image data of a person, place, or object, which may then be used to render a 2D image of the person, place, or object.

Image data captured by image capture system 110 may be read out by readout circuitry 140. Said readout circuitry may include amplification circuitry, analog-to-digital conversion ("ADC") circuitry, or otherwise. The image data may be stored or further manipulated by functional logic 150 to apply post image effects (e.g., crop, rotate, remove red eye, adjust brightness, adjust contrast, or otherwise).

Control circuitry 120 may control the operation of image capture system 110. For example, control circuitry may generate a shutter signal for controlling image acquisition. Control circuitry 120 may further receive image information (e.g., electric signals) and command image capture system 110 to change the focal length of its solid state die to get an in-focus image similar to the example embodiments of the invention described below.

Operating unit 130 may comprise a computing or processing unit related to electronic system 100. For example, electronic system 100 may be a mobile phone, and operating unit 130 may be a telephone unit that is responsible for telephone operation of the system.

Figure 2A:
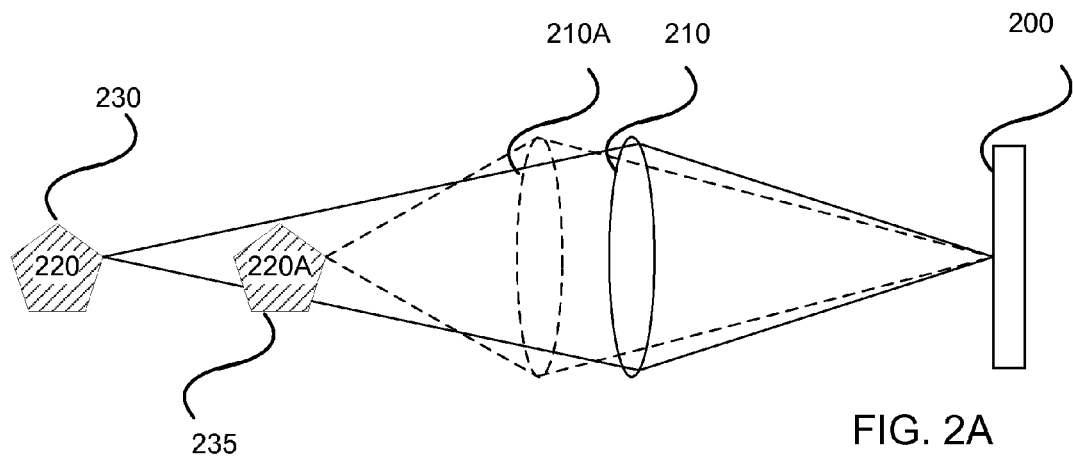
FIG. 2A and FIG. 2B are illustrations of focus mechanisms to correct an out-of-focus image to an in-focus image in accordance with embodiments of the disclosure.
Figure 2B:
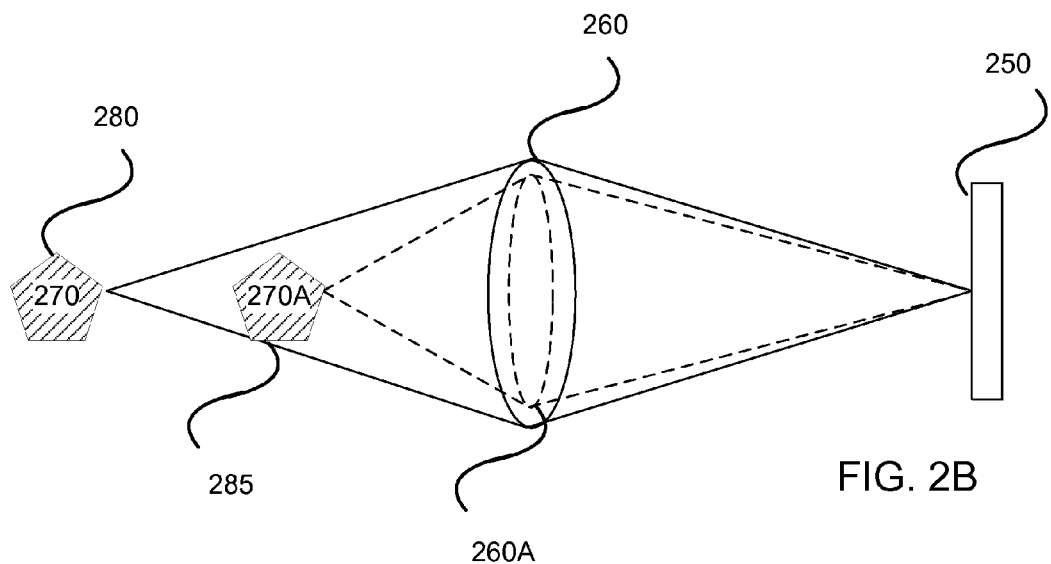

FIG. 2A and FIG. 2B are illustrations of focus mechanisms to correct an out-of-focus image to an in-focus image in accordance with an embodiment of the disclosure. It is understood that in-focus images are formed on image sensors, such as image sensor 200 (alternatively referred to herein as an "image plane") of FIG. 2A, when the distance of an object to lens 210 (i.e., object distance 'o'), the distance of image sensor 200 to lens 210 (i.e., image distance 'i'), and the focal length of lens 210 (T) satisfy the equation:

$$1/o + 1/i = 1/f.$$

FIG. 2A illustrates lens 210 forming an in-focus image of object 220 on image sensor 200 when the object is at position 230. When object 220 is moved to a position 235 (shown as object 220A), an out-of-focus image is formed on image sensor 200 by lens 210 (i.e., the above described equation is no longer satisfied due to the changes in the value '1/o'). Accordingly, the image formed on image sensor is not in-focus (i.e., blurred). In this example focus mechanism, to correct the out-of-focus image on image sensor 200, lens 210 is moved to a new position (illustrated as lens 210A). This new position will form an in-focus or sharp image of object 220A at position 235 on image sensor 200 by altering the values '1/o' and '1/i' to satisfy the above equation.

FIG. 2B is another illustration of a focus mechanism to correct an out-of-focus image to an in-focus image. Lens 260 forms an image of object 270 at position 280 on image sensor 250. When object 270 is moved to position 285 (shown as object 270A), an out-of-focus image is formed on image sensor 250 via lens 260. In this example, to correct the out-of-focus image on image sensor 250, the focal length of lens 260 is changed to a new focal length (shown as lens 260A). This new focal length for lens 260A will form an in-focus or sharp image of object 270A at position 285 on image sensor 250 by altering the value '1/f' to satisfy the above equation.

It is to be understood that while image capture systems may include lens units with the focusing capabilities illustrated in FIG. 2A or FIG. 2B, some image capture units such as camera modules will include a fixed focal length, fixed position lens and thus will have no focusing capabilities.

Figure 3:
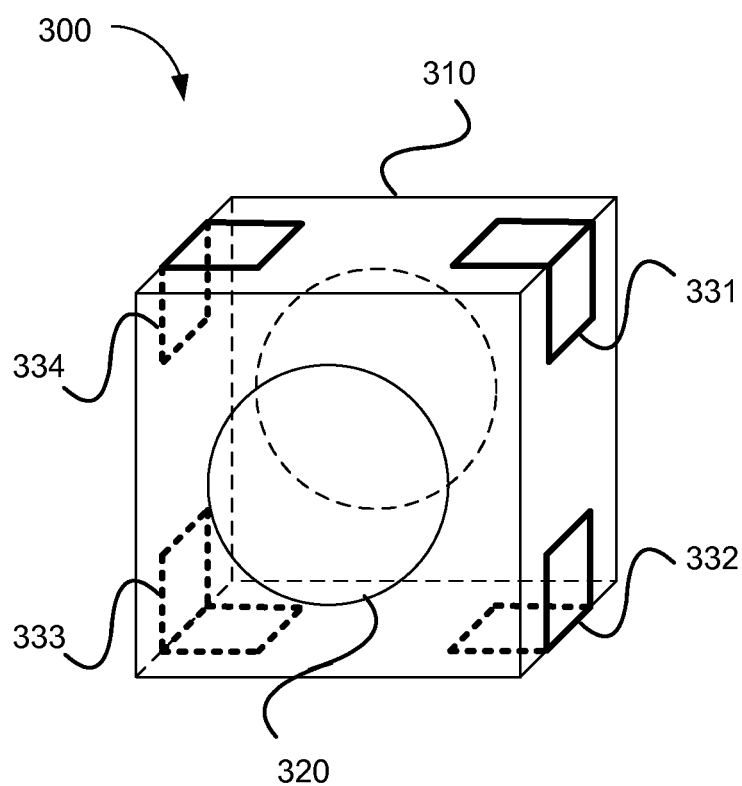
FIG. 3 is a block diagram of a solid state die to enhance or provide focusing capabilities for image capture units in accordance with an embodiment of the disclosure.

FIG. 3 illustrates an example of solid state die to enhance or provide focusing capabilities for image capture systems in accordance with an embodiment of the disclosure. Solid state die 300 is capable of changing its focal length, as described above and illustrated in FIG. 2B. Thus, solid state die 300 may be employed in combination with a lens unit of an image capture system to form an in-focus image. Solid state die 300 alone may also act as an optical lens capable of forming an image.

It is to be understood that an image capture system combining solid state die 300 with a camera module that includes a fixed position lens having a fixed focal length—i.e., an image capture unit without focusing capabilities, enables said image capture system to have image focusing capabilities at a potentially low-cost and reduced dimension without significantly redesigning the camera module.

Solid state die 300 may be comprised of, for example, liquid crystal materials or any functionally equivalent material whose refractive index may be modified via an electric field. Under an applied electric field, the refractive index of solid state die 300 is modulated locally. Applying different electric fields will cause solid state die 300 to have different focal lengths.

In this embodiment, solid state die 300 is enclosed by housing 310. Solid state die 300 includes active area 320 to transmit light through and to focus the transmitted light on an image sensor of the image capture system (described below). In this embodiment, solid state die 300 includes electrodes 331, 332, 333 and 334 at corners of housing 310. Electrodes 331-334 are configured to electrically couple to a controlling unit, which will control the voltage or electric signal received by the electrodes, thereby affecting the modulation of the refractive index of active area 320. In one embodiment, an auto-focus controlling unit (described below) controls the voltage or electric signal received by electrodes 331-334. In other embodiments, the controlling unit controls the voltage or electric signal received by electrodes 331-334 based on non-automated focusing commands (e.g., user commands).

Figure 4A:
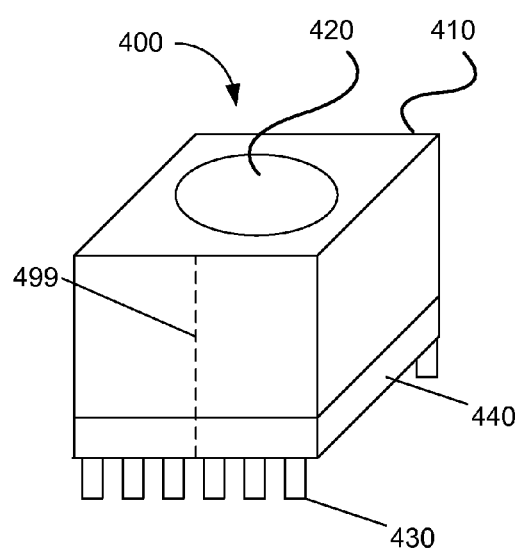
FIG. 4A and FIG. 4B are illustrations of an image capture unit or camera module in accordance with an embodiment of the disclosure.
Figure 4B:
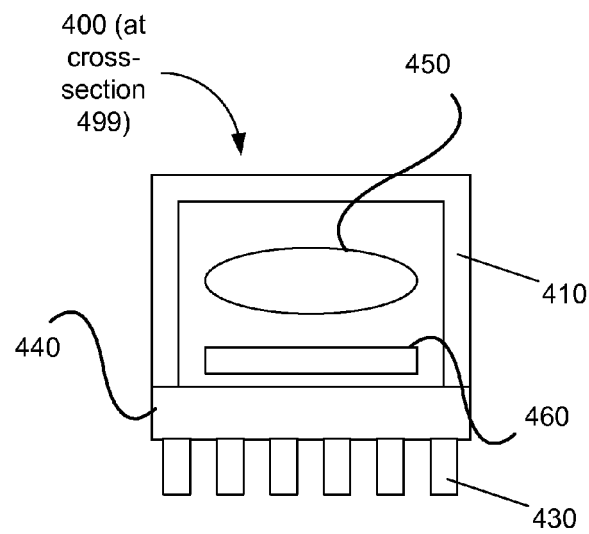

FIG. 4A and FIG. 4B are illustrations of an image capture unit that may be a camera module in accordance with an embodiment of the disclosure. As illustrated in FIG. 4A, camera module 400 includes housing 410 with optical opening 420 and base 440. Camera module 400 further includes connectors 430 extending from base 440.

In one embodiment, base 440 is designed to be mounted to a printed circuit board (PCB) via connectors 430, wherein said connectors are in a form of a pin grid array (PGA) or a ball grid array (BGA). In one embodiment, camera module 400 is a reflowable module that may be reflowed onto a PCB using a solder reflow technique, such as reflowing a BGA of solder balls to form solder joints with the PCB.

FIG. 4B shows a view of camera module 400 at cross section 499. Camera module 400 includes lens unit 450 and image sensor 460 disposed on base 440 inside housing 410. Lens unit 450 may include a single lens or a combination of several lens elements. In this embodiment, optical opening 420 (as shown in FIG. 4A) is aligned with lens unit 450 and image sensor 460.

Figure 5:
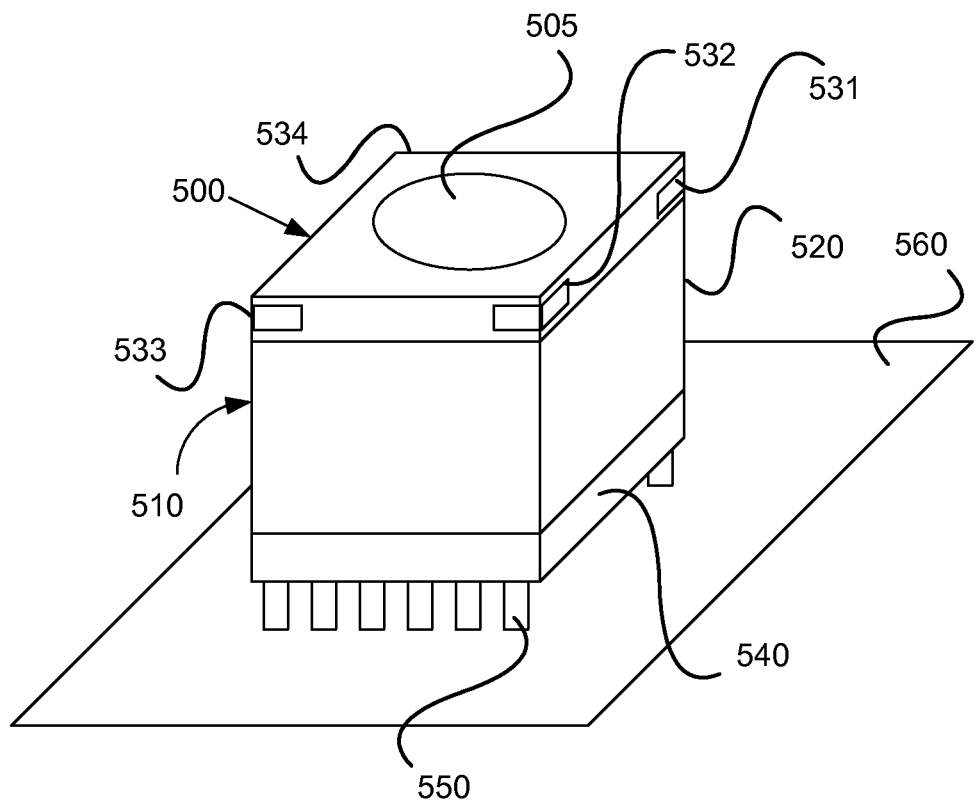
FIG. 5 is a block diagram of a solid state die disposed on an image capture unit or camera module in accordance with an embodiment of the disclosure.

FIG. 5 is a block diagram of an image capture system in accordance with an embodiment of the disclosure. In this embodiment, solid state die 500 (e.g., similar to solid state die 300 of FIG. 3) is disposed on camera module 510 to provide or enhance focusing capabilities for the image capture system. In one embodiment, camera module 510 includes a fixed position, fixed focal length lens unit, and accordingly does not alone have focusing capability.

In order to enhance or add focusing capabilities to the image capture system in accordance with an embodiment of the disclosure, solid state die 500 is disposed on camera module 510. Active area 505 of solid state die 500 is aligned with an optical opening of the camera module (e.g., similar to opening 420 of FIG. 4A) such that light may be transmitted through and be focused by solid state die 500 in combination with the lens unit of camera module 510 to form a focused image on an image sensor of the camera module.

Solid state die 500 includes electrodes 531, 532, 533 and 534 (e.g., similar to electrodes 331-334 of solid state die 300 of FIG. 3). As described above, voltage or electric signal received by electrodes 531-534 effectively generates an electric field, which modulates active area 505 (e.g., similar to active area 320 of FIG. 3) to focus the image formed on the image sensor of camera module 510. Electrodes 531-534 may receive voltage or electric signal from camera module 510, or may receive voltage or electric signal directly from PCB 560.

The voltage or electric signal received by electrodes 531-534 may originate from focus modules or circuitry. In one embodiment, the focus circuitry is controlled by a user of the image capture system. In another embodiment, electrodes 531-534 receive voltage or electric signal from auto-focus circuitry. For example, said auto-focus circuitry may modulate active area 505 of solid-state die 500 to increase the intensity of the light on the image sensor of camera module 510 until the maximum intensity is achieved. In another example, said auto-focus circuitry may utilize finite impulse response (FIR) filters to determine the edge features of the image on the image sensor of camera module 510 and their sharpness. In another example, said auto-focus circuitry may measure the distance from the object of interest and map the distance to some measurable quantity that drives the modulation of active area 505 of solid-state die 500 to arrive at the correct focus.

In one embodiment, an adhesive may be applied between solid-state die 500 and camera module housing 520 (e.g., similar to housing 410 of FIG. 4A and FIG. 4B) to mount the die to housing 520. In another embodiment, housing 520 may be shaped or include features to securely hold solid state die 500 in place.

Electrodes 531-534 of solid state die 500 may be electrically coupled to base 540 of camera module 510 or PCB 560 via any coupling means known in the art, such as wire bonding. Considering issues such as durability, reliability, dimension, and manufacturing yield, solutions such as wire bonding may not be optimal.

Figure 6:
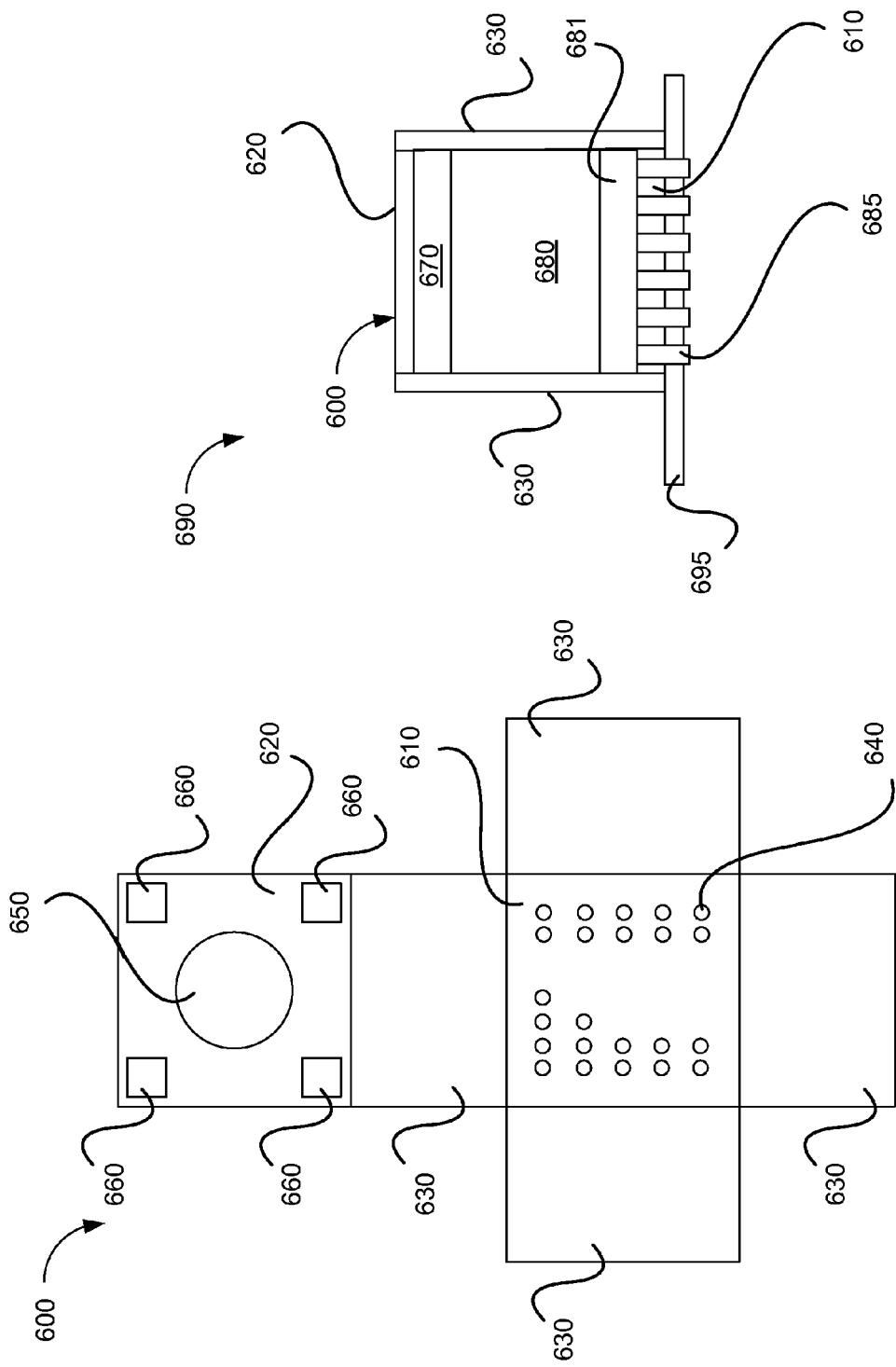
FIG. 6A and FIG. 6B are illustrations of an enclosure for an image capture system including a solid state die and an image capture unit in accordance with an embodiment of the disclosure.

FIG. 6A and FIG. 6B are illustrations of an enclosure or a second housing for an image capture system including a solid state die and a camera module having a first housing in accordance with an embodiment of the disclosure. As illustrated in FIG. 6A, flexible PCB (FPC) 600 is designed to "fold" into an enclosure (e.g., a second housing). FPC 600 includes bottom 610, top 620, and four sidewalls 630. In this embodiment, bottom 610 includes holes 640 that will let connectors of a camera module pass through (e.g., connectors 550 of FIG. 5). Top 620 has opening 650 conforming with an active area of the solid state die and a lens unit of the camera module. Opening 650 transmits light through for forming an image on an image sensor of the camera module. Opening 650 may be covered by a transparent protector such as glass or plastic (not shown).

In this embodiment, top 620 of FPC 600 includes electrodes 660. These electrodes are shown to conform with a solid state die having four electrodes (e.g., solid state die 500 of FIG. 5).

FIG. 6B illustrates a "folded" view of FPC 600. In this embodiment, base 681 (e.g., similar to base 540 of FIG. 5) of camera module 680 is disposed on bottom 610 of FPC 600, such that connectors 685 (e.g., similar to connectors 550 of FIG. 5) extending from base 681 pass through holes 640 (see FIG. 6A) to allow camera module 680 to couple to PCB or substrate 695.

In this embodiment, FPC 600 is folded to form enclosure shape 690 to enclose camera module 680 and solid state die 670. The seams may be soldered to ensure shape 690 is held in place.

Furthermore, top 620 and four sidewalls 630 of FPC 600 may include metal stiffeners. It is to be understood that these metal stiffeners, when FPC 600 is formed to shape 690 (e.g., second housing), may serve as EMI shielding to prevent misfocusing and other errors caused by EMI. The metal stiffeners may also serve as ground. Bottom 640 of FCP 600 may also include a metal layer to provide additional EMI sheilding.

The image capture system in accordance with an embodiment of the disclosure having enclosure or second housing 690 as illustrated in FIG. 6B may be reflowable.

Figure 7:
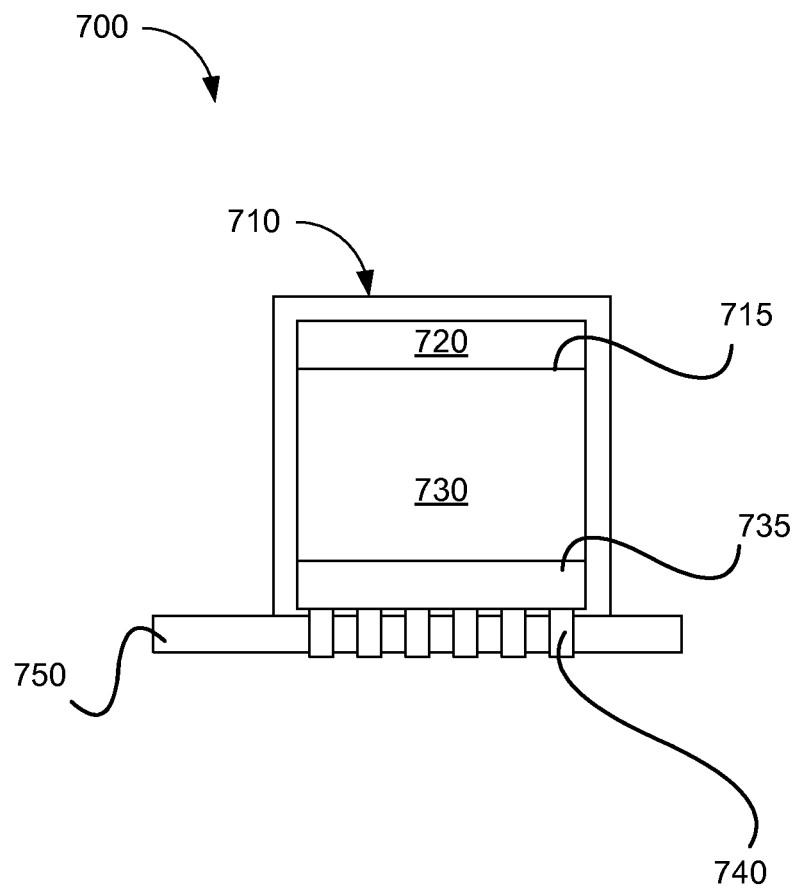
FIG. 7 is an illustration of a cross-sectional view of an enclosure for an image capture system in accordance with an embodiment of the disclosure.

FIG. 7 is an illustration of a cross-sectional view of an enclosure or a second housing for an image capture system in accordance with an embodiment of the disclosure. In this embodiment, image capture system 700 includes molded housing 710 (as opposed to the above described folded FPC housings). A camera module 730 having housing 715 (e.g., similar to housing 520 of FIG. 5) is disposed on PCB or substrate 750. Connectors 740 extending from base 735 of camera module 730 are coupled to PCB or substrate 750. Solid state die 720 is disposed on housing 715 (e.g., first housing) of camera module 730. Molded housing 710 (e.g., second housing) encloses both solid state die 720 and camera module 730. In one embodiment, molded housing 710 comprises a metal material, to provide EMI shielding. In one embodiment, molded housing 710 is an insert molding type housing.

Housing 710 may include a mechanical latch such that housing 710 is securely mounted on PCB or substrate 750. Alternatively, an adhesive or sealant may be used to mount housing 710 to PCB or substrate 750. Connectors 740 extending from base 735 of camera module 730 are mounted to PCB 750. In contrast to FIG. 6B showing that FPC bottom 610 is between base 681 of camera module 680 and PCB 695, in the embodiment illustrated in FIG. 7, base 735 of camera module 730 is directly disposed on PCB 750.

Figure 8:
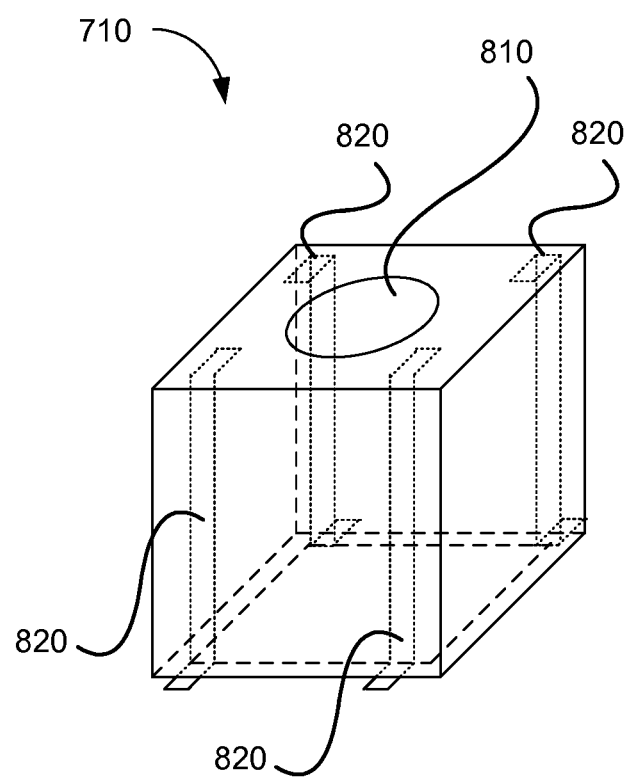
FIG. 8 is an illustration of an enclosure to provide electrical coupling to a solid state die of an image capture camera system in accordance with an embodiment of the disclosure.

FIG. 8 is an illustration of an enclosure to provide electrical coupling to a solid state die of an image capture system in accordance with an embodiment of the disclosure. In this illustration, housing 710 of FIG. 7 is shown without an enclosed image capture system. In this embodiment, housing 710 is an enclosure or a second housing to provide electrical coupling to a solid state die of an image capture system. Housing 710 may be designed to enclose a camera module having a first housing together with a solid state die to form an image capture system with focusing capabilities as described above. Housing 710 also provides electrical couplings 820 to couple electrodes of the solid state die to electrical circuits of the camera module, or PCB or substrate of the image capture system containing electrical circuitry. Electrical couplings 820 may comprise electrodes formed on an interior side or sides of housing 710. In one embodiment, a conductive adhesive may be provided at the electrodes of the solid state die to attach said electrodes to electrical couplings 820 of housing 710.

Housing 710 further includes opening 810 to be aligned with an active area of the solid state die (which, as described above, will be aligned with a lens unit of the camera module).

Housing 710 may comprise conductive or non-conductive materials. In embodiments where housing 710 comprises a conductive material (e.g., metal), electrical couplings 820 of housing 710 may be configured to be properly insulated by an isolator—e.g., isolator materials covering the couplings except at exposed terminals. Thus, electrical couplings 820 are insulated from the conductive material of housing 710. The metal housing in this embodiment may serve as EMI shielding, and may also serve as ground. In one embodiment, housing 710 is an insert molding type housing.

The image capture system in accordance with an embodiment of the disclosure having enclosure or second housing 710 as illustrated in FIG. 7 and FIG. 8 may be reflowable.

Figure 9:
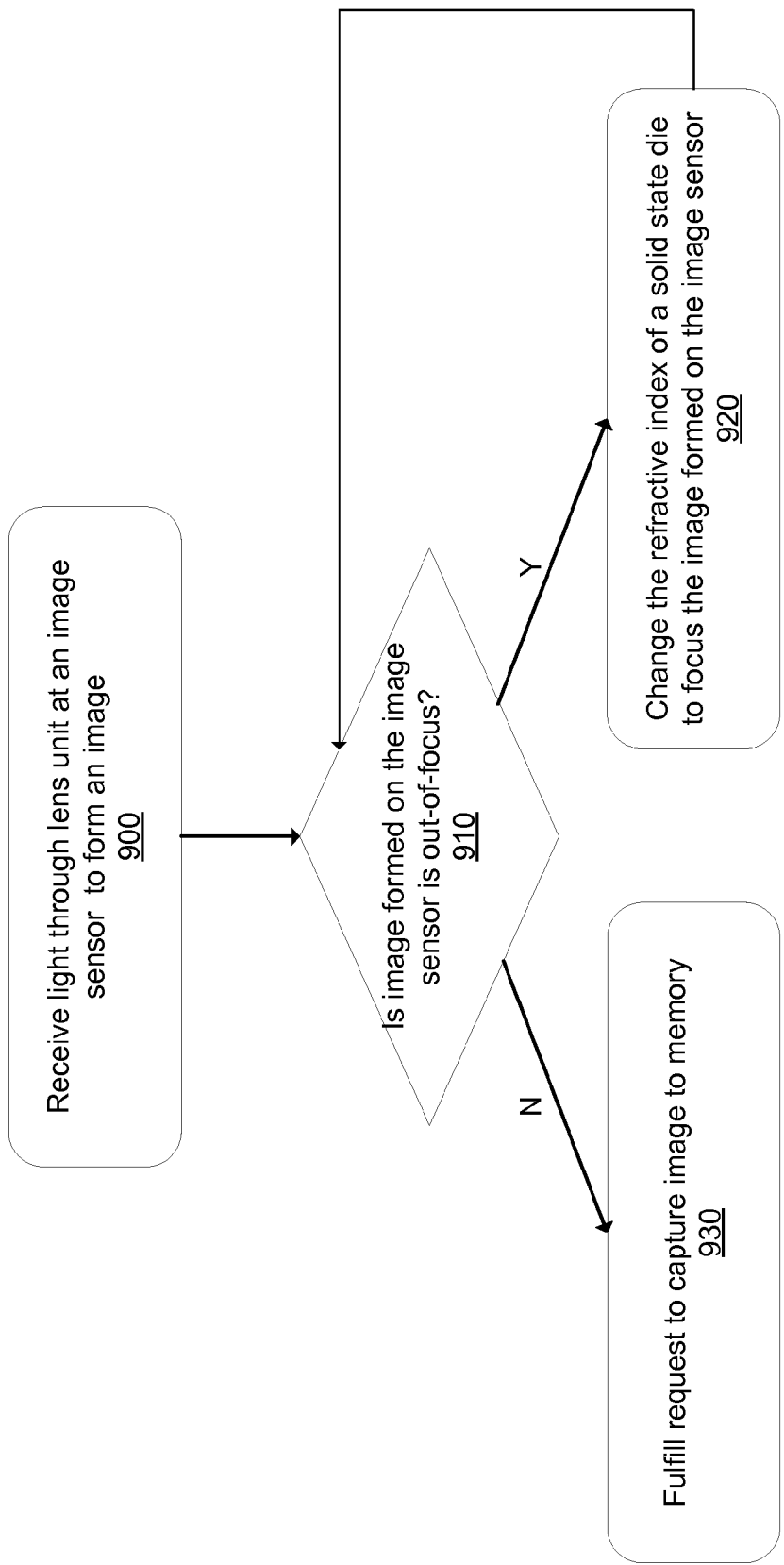
FIG. 9 is a flow diagram of a process in accordance with an embodiment of the disclosure.

FIG. 9 is a flow diagram of a process in accordance with an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Light through a lens unit is received at an image sensor and an image is formed on the image sensor, 900. A focus module or focus circuitry may determine whether the image formed on the image sensor is out-of-focus, 910. If it is determined that the image is out-of-focus, then the focus module/circuitry may execute operations to change an electric field at a solid state die disposed on the lens unit. This will change the refractive index of the solid state die to focus the image formed on the image sensor, 920. Once it is determined that the image is in-focus, requests to capture said image may be fulfilled, 930.

It is to be understood that the camera module, solid state dies and housings illustrated in the above described figures are square shaped as examples only, and that in other embodiments of the invention, other shapes may be utilized (e.g., rectangular, circular).

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim 1nterpretation.

The invention claimed is:

1. A system comprising:
    an image capture unit including:
        a first housing having an interior defined by a base, a top opposite to and spaced apart from the base, and a plurality of sidewalls coupling the base to the top, wherein the top has a first opening therein and the base has a plurality of electrical connectors extending therefrom,
        an image sensor positioned on the base in the interior of the first housing, and
        a lens unit positioned in the interior of the first housing, the lens unit optically coupling the first opening and the image sensor;
    a solid state die positioned on an exterior side of the top of the first housing, the solid state die including an active area optically aligned with the first opening and optically coupled to the lens unit, wherein the refractive index of the active area can be changed based on an electric field applied to the active area via a first plurality of electrodes; and
    a second housing having an interior defined by a top and a plurality of sidewalls coupled to the edges of the top, the image capture unit and the solid state die being positioned in the interior of the second housing with the solid state die sandwiched between the top of the first housing and the top of the second housing, wherein the top of the second housing has a second opening therein that is optically aligned with the active area and the first opening, and wherein the second housing includes a second plurality of electrodes to electrically couple to the first plurality of electrodes.

2. The system of claim 1, wherein the second housing comprises a folded flexible printed circuit board (FPC).

3. The system of claim 2, wherein the FPC includes metal stiffeners to form electro-magnetic interference (EMI) shielding.

4. The system of claim 2, wherein the first housing is disposed on a first part of the FPC, and the solid state die is mounted to a second part of the FPC.

5. The system of claim 2, wherein the image capture unit includes a plurality of connectors, the second housing includes a plurality of holes corresponding to and passed through by the plurality of connectors.

6. The system of claim 1, wherein the second housing comprises a molded metal to form EMI shielding.

7. The system of claim 6, wherein the second housing comprises an insert molding type housing.

8. The system of claim 6, wherein the second plurality of electrodes are included in a plurality of interior sides of the second housing.

9. The system of claim 1, the system further comprising:
    control circuitry to control the image capture unit and the solid state die; and
    a substrate including electrical couplings to operatively couple the second electrodes of the second housing and the control circuitry.

10. The system of claim 9, wherein the second housing is coupled to the substrate via an adhesive.

11. The system of claim 1, further comprising a transparent cover to cover the second opening of the second housing.

12. An apparatus comprising:
    an image capture unit including:
        a first housing having an interior defined by a base, a top opposite to and spaced apart from the base, and a plurality of sidewalls coupling the base to the top, wherein the top has a first opening therein and the base has a plurality of electrical connectors extending therefrom,
        an image sensor positioned on the base in the interior of the first housing, and
        a lens unit positioned in the interior of the first housing, the lens unit optically coupling the first opening and the image sensor;
    a solid state die positioned on an exterior side of the top of the first housing, the solid state die including an active area optically aligned with the first opening and optically coupled to the lens unit, wherein the refractive index of the active area can be changed based on an electric field applied to the active area via a first plurality of electrodes; and a second housing having an interior defined by a top and a plurality of sidewalls coupled to the edges of the top, the image capture unit and the solid state die being positioned in the interior of the second housing with the solid state die sandwiched between the top of the first housing and the top of the second housing, wherein the top of the second housing has a second opening therein that is optically aligned with the active area and the first opening, and wherein the second housing includes a second plurality of electrodes to electrically couple to the first plurality of electrodes;

wherein the second housing comprises a molded metal to form EMI shielding.

13. The apparatus of claim 12, wherein the second housing comprises an insert molding type housing.

14. The apparatus of claim 12, wherein the plurality of electrodes of the second housing are included in a plurality of interior sides.

15. The apparatus of claim 12, further comprising an adhesive disposed on the second housing to couple the second housing to a substrate.

16. The apparatus of claim 12, further comprising a transparent cover to cover the opening of the first housing.

17. A system comprising:
an image capture subsystem, including:
an image capture unit including:
a first housing having an interior defined by a base, a top opposite to and spaced apart from the base, and a plurality of sidewalls coupling the base to the top, wherein the top has a first opening therein and the base has a plurality of electrical connectors extending therefrom,
an image sensor positioned on the base in the interior of the first housing, and
a lens unit positioned in the interior of the first housing, the lens unit optically coupling the first opening and the image sensor;
a solid state die positioned on an exterior side of the top of the first housing, the solid state die including an active area optically aligned with the first opening and optically coupled to the lens unit, wherein the refractive index of the active area can be changed based on an electric field applied to the active area via a first plurality of electrodes;
a second housing having an interior defined by a top and a plurality of sidewalls coupled to the edges of the top, the image capture unit and the solid state die being positioned in the interior of the second housing with the solid state die sandwiched between the top of the first housing and the top of the second housing, wherein the top of the second housing has a second opening therein that is optically aligned with the active area and the first opening, and wherein the second housing includes a second plurality of electrodes to electrically couple to the first plurality of electrodes;
a controlling unit coupled to the second plurality of electrodes of the second housing;
readout circuitry coupled to the plurality of connectors of the image capture unit to readout image data from the image sensor of the image capture unit; and
an operating unit coupled to the image capture subsystem.

18. The system of claim 17, wherein the system comprises a mobile phone and the operating unit comprises a telephone unit.

* * * * *